No. 857,386. PATENTED JUNE 18, 1907.
C. E. DAILEY.
MACHINE FOR DECORTICATING MANILA FIBER, &c.
APPLICATION FILED OCT. 22, 1906.
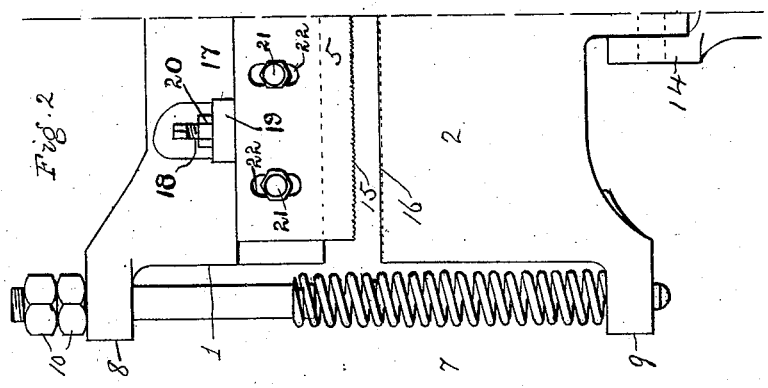
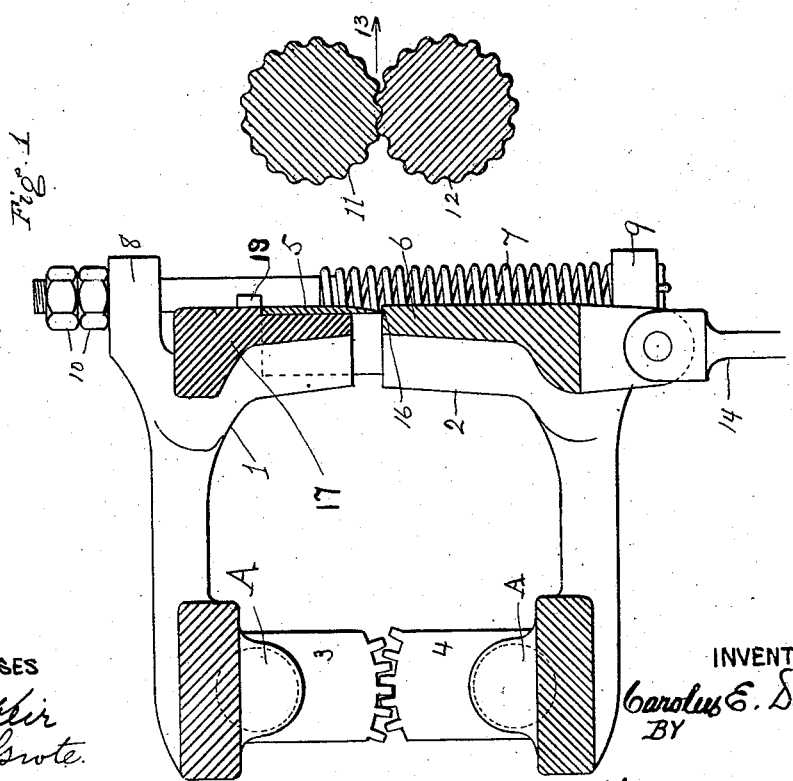
WITNESSES
INVENTOR
Carolus E. Dailey
BY
Howson and Howson
ATTORNEYS

UNITED STATES PATENT OFFICE.

CAROLUS E. DAILEY, OF BROOKLYN, NEW YORK.

MACHINE FOR DECORTICATING MANILA FIBER, &c.

No. 857,386.     Specification of Letters Patent.     Patented June 18, 1907.

Application filed October 22, 1906. Serial No. 340,029.

*To all whom it may concern:*

Be it known that I, CAROLUS E. DAILEY, a citizen of the United States of America, and residing in the borough of Brooklyn, county of Kings, and State of New York, have invented certain new and useful Improvements in Machines for Decorticating Manila Fiber and other Fibers, of which the following is a specification.

My invention relates to an improvement in machines for decorticating Manila fiber and other fibers from which it is necessary to remove the pulp and outer skin from the bark or leaves in the preparation of the fibers for use.

My invention has special reference to an improvement in the blades used in decorticating machines such as that described in my Patent No. 815,799.

In the accompanying drawings Figure 1 is a vertical section of the blade-bearing jaws of a machine showing my improved knife in place; and Fig. 2 is a front elevation of the same.

Referring to the drawings I show the knife jaws 1 and 2 pivoted to the frame of the machine and provided with meshing pinions on the angle arms 3 and 4. The blade 5 of the upper jaw is normally held against the lower blade 6 by the action of the spring 7 secured to the two jaws at 8 and 9. The tension of this spring may be regulated by the nuts 10. Rollers 11 and 12 operate to pull the fibrous bark or like material between the jaws in the direction of the arrow 13. Means 14 are provided for opening the knife jaws against the action of the spring 7.

It will be noted that I mount the upper blade 5 adjustably upon the backing plate 17 by means of screw threaded bolts 18 carried by the blade and working within a lug 19 on the backing plate. The adjustment is secured by means of the nut 20, while the blade is made firm to the backing plate after adjustment, through bolts and nuts 21 which pass through holes in the backing plate and slots 22 in the blade. It is also apparent from Fig. 1 that the blades are set at an angle to and not directly across the grain of the fiber as it is drawn between them by the rollers 11 and 12, and by this means I secure the peculiarly effective scraping motion pointed out in my patent above referred to.

The machine described in my Patent No. 815799 has heretofore been provided with blades having flat scraping edges. I have found that a great improvement in the operation of the machine is effected by serrating the edge of one blade with fine teeth 15, providing the other blade with a groove 16 and adjusting the two blades so that the serrated edge of one enters the groove of the other. With these improved blades not only is the outer pulp and skin scraped off, but the material is shredded, the fibers being separated and prepared for use in the single operation.

I claim as my invention

1. In a machine for decorticating Manila or other fibers, decorticating parts consisting of a blade having a grooved edge and a blade having a sharpened edge adapted to coöperate with the grooved blade in combination with means tending to hold said blades constantly in juxtaposition.

2. In a machine for decorticating Manila or other fibers, decorticating parts consisting of a blade having a sharpened serrated edge and a blade having a grooved edge adapted to coöperate with said sharpened blade.

3. In a machine for decorticating Manila or other fibers, decorticating parts consisting of a blade having a grooved edge and a blade having a sharpened serrated edge adapted to coöperate with the grooved blade, said blades being set at other than a right angle to the direction of pulls of the fiber passing between said blades.

4. In a machine for decorticating Manila or other fibers, decorticating parts consisting of a blade having a grooved edge and a blade having a sharpened serrated edge adapted to coöperate with the grooved blade, and means tending to keep said blades constantly in juxtaposition.

5. In a machine for decorticating Manila or other fibers, decorticating parts consisting of a blade having a grooved edge and a blade having a sharpened serrated edge adapted to coöperate with the grooved blade, and spring means tending to keep said blades constantly in juxtaposition.

6. In a machine for decorticating Manila and other fibers, decorticating parts consisting of a blade having a grooved edge and a blade having a sharpened serrated edge adjustably secured to a backing plate and adapted to coöperate with the grooved blade, substantially as described.

In testimony whereof I have signed my name to this specification, in the presence of two subscribing witnesses.

CAROLUS E. DAILEY.

Witnesses:
ARTHUR H. FOLGER,
WILLIAM ABBE.